(12) United States Patent
Hohs

(10) Patent No.: US 9,619,484 B2
(45) Date of Patent: Apr. 11, 2017

(54) METHOD AND SYSTEM FOR DETERMINING GEOGRAPHIC DATA TO DISPLAY

(71) Applicant: Navteq B.V., Veldhoven (NL)

(72) Inventor: Cory James Hohs, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 234 days.

(21) Appl. No.: 13/769,738

(22) Filed: Feb. 18, 2013

(65) Prior Publication Data

US 2014/0236937 A1 Aug. 21, 2014

(51) Int. Cl.
G06F 17/30 (2006.01)
(52) U.S. Cl.
CPC .............................. *G06F 17/30241* (2013.01)
(58) Field of Classification Search
CPC . G06F 17/30; G06F 17/30241; G08G 1/9069; G01C 21/34; G01C 21/3679
USPC .................................................. 707/918–921
See application file for complete search history.

(56) References Cited

U.S. PATENT DOCUMENTS

| | | | |
|---|---|---|---|
| 7,565,241 B2* | 7/2009 | Tauchi | 701/446 |
| 7,689,595 B2* | 3/2010 | Boss et al. | 707/999.107 |
| 7,777,648 B2* | 8/2010 | Smith et al. | 340/995.1 |
| 7,831,383 B2* | 11/2010 | Oohashi | 701/452 |
| 8,078,601 B1* | 12/2011 | Egnor et al. | 707/705 |
| 8,386,426 B2* | 2/2013 | Owen et al. | 707/624 |
| 2004/0220957 A1* | 11/2004 | McDonough | 707/102 |
| 2005/0038599 A1* | 2/2005 | Lehmann et al. | 701/208 |
| 2005/0114021 A1* | 5/2005 | Krull et al. | 701/211 |
| 2006/0223494 A1* | 10/2006 | Chmaytelli et al. | 455/404.2 |
| 2007/0260628 A1* | 11/2007 | Fuchs et al. | 707/101 |
| 2008/0176545 A1* | 7/2008 | Dicke et al. | 455/418 |
| 2009/0171558 A1* | 7/2009 | Davis et al. | 701/200 |
| 2010/0106397 A1* | 4/2010 | Van Essen | G06F 17/30241 701/532 |
| 2012/0036150 A1* | 2/2012 | Richter et al. | 707/769 |

* cited by examiner

*Primary Examiner* — Robert Beausoliel, Jr.
*Assistant Examiner* — Arthur Ganger
(74) *Attorney, Agent, or Firm* — Lempia Summerfield Katz LLC

(57) ABSTRACT

When a first map application initiates a search of a first geographic database associated with the first map application, for geographic data or when the first geographic database does not return at least a portion of the geographic data in response to the search, the first map application initiates a search of a second geographic database for at least the portion of the geographic data. The second geographic database is associated with a second map application. If the second geographic database includes the portion of the requested data, the first map application displays the geographic data, which is received from the first database, the second database, or a combination thereof. The first map application also requests that a user input the portion of the geographic data not included in the first geographic database, which may then be added to the first geographic database.

25 Claims, 5 Drawing Sheets

METHOD AND SYSTEM FOR DETERMINING GEOGRAPHIC DATA TO DISPLAY

FIELD

The present embodiments relate to determining data to display in response to a request for geographic data.

BACKGROUND

A map application may run on a computing device such as, for example, a smart phone. The map application may display, in response to a request made by a user at the smart phone, data representing a geographic map surrounding a location (e.g., an address) or a point of interest (POI) (e.g., a restaurant), directions between the location and the POI, POIs around the location, or a combination thereof.

For example, the user may use the map application to search a geographical database associated with the map application for the address. When the geographical database includes data representing the address, the geographical database transmits the data to the smart phone, where the data is displayed to the user. When the geographical database does not include the data representing the address, the geographical database may transmit incorrect data (e.g., data for an address numerically close to the address) or may not transmit data at all. Accordingly, the map application may display incorrect data to the user or may display a message to the user indicating that the address was not found.

When the map application returns incorrect data to the user, the user may be directed to an incorrect address, potentially wasting the user's time or making the user late to an event. When the map application displays the message to the user indicating that the address was not found, the user still needs to view the data representing the address. Such experiences with the map application may make the user less likely to continue using the map application and may cause the user to start or continue using another map application.

SUMMARY

When a first map application initiates a search of a first geographic database associated with the first map application, for geographic data or when the first geographic database does not return at least a portion of the geographic data in response to the search, the first map application initiates a search of a second geographic database for at least the portion of the geographic data. The second geographic database is associated with a second map application. If the second geographic database includes the portion of the requested data, the first map application displays the geographic data, which is received from the first database, the second database, or a combination thereof. The first map application also requests that a user input the portion of the geographic data not included in the first geographic database, which may then be added to the first geographic database.

In one aspect, a method includes receiving data representing a request for geographic data. A first search for the geographic data is initiated. The first search is of a geographic database. A second search for the geographic data is initiated based on the initiated first search. The second search is of a second geographic database. A processor determines data to be displayed at a computing device. The data to be displayed at the computing device includes first data, second data, or a combination thereof. The first data is receivable in response to the initiated first search. The second data is receivable in response to the initiated second search.

BRIEF DESCRIPTION OF THE DRAWINGS

Exemplary embodiments of the present invention are described herein with reference to the following drawings.

DETAILED DESCRIPTION

When a user of a map application running on a personal computing device such as, for example, a mobile device or a desktop computer searches for an address or a point of interest (POI), the map application searches a first geographic database for the address or POI. The first geographic database corresponds to the map application and is run by a first company. The map application searches or initiates a search of, in series or parallel with the searching of the first geographic database, a second geographic database. The second geographic database corresponds to a map application run by a second company. The second company may be a partner or a competitor of the first company.

The map application searches or initiates the search of the second geographic database at the same time as the search of the first geographic database or only after the map application determines that the first geographic database does not include the address or the POI. Data received in response to the search of the first geographic database and/or data received in response to the search of the second geographic database may be cached at a memory of the personal computing device.

When the first geographic database does not include the address or the POI, the map application pushes a first message to the user. The first message indicates that the address or the POI was not found in the first geographic database. The first message may also indicate that the user will be provided the address or the POI from the second geographic database, assuming the second geographic database includes the address or the POI. The user may view data for the address or the POI from the second geographic database within the map application or may be directed to a different map application. Once the user routes to the address or the POI or identifies that the data from the second geographic database was useful, the map application pushes a second message to the user. The second message requests that the user provide the data for the address or the POI so that the data for the address or the POI may be added to the first geographic database.

Figure 1:
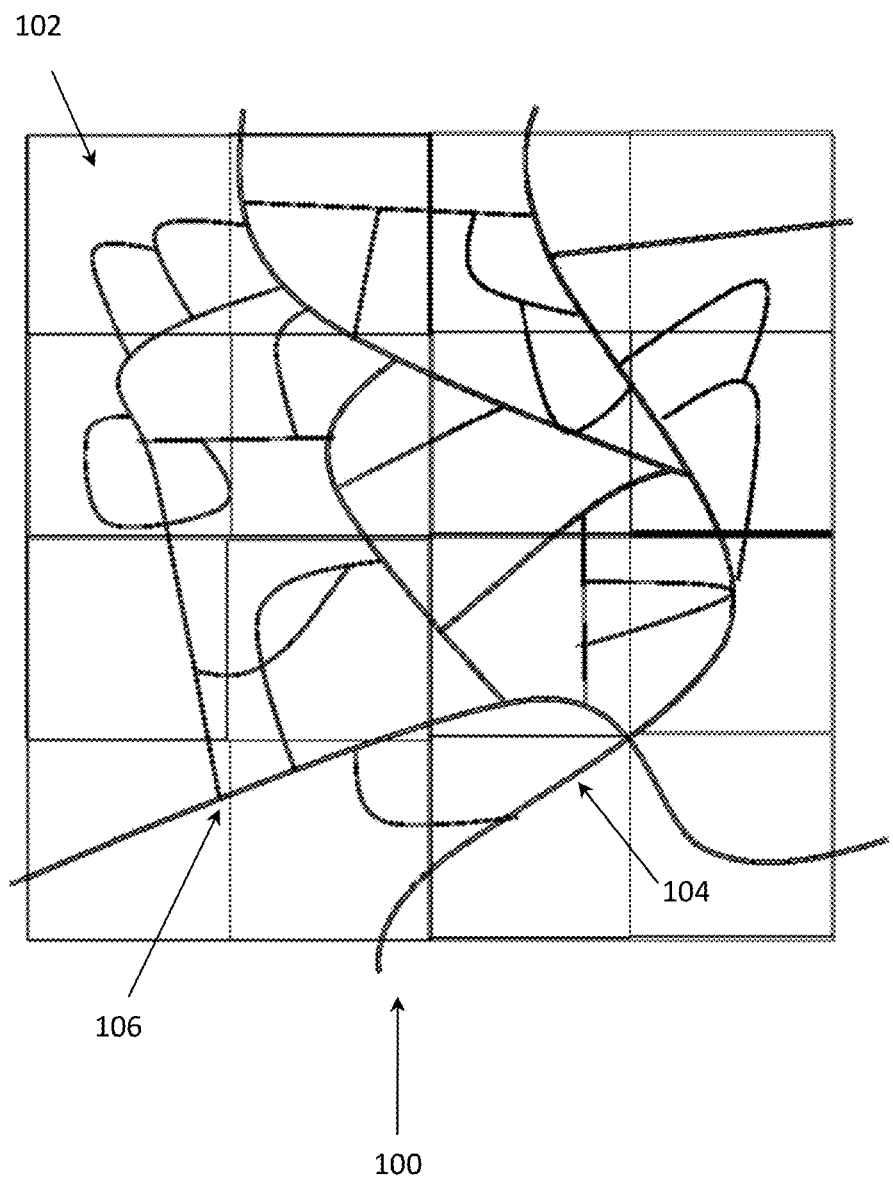
FIG. 1 shows an exemplary geographic region.

FIG. 1 is a diagram illustrating a geographic region 100. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may represent locations without reference to geo-political boundaries, such as being a rectangular region centered on or relative to a particular point or location.

The region 100 includes a road network 102. The road network 102 may include, among other things, a plurality of road segments 104 connected at intersections 106 throughout the region 100. Though not depicted herein, the region 100 may also or alternatively include one or more points of interest, such as businesses, municipal entities, tourist attractions, and/or other points of interest, one or more topographical features (e.g., ponds, lakes, mountains, hills, etc.), a pedestrian network having sidewalks and pedestrian paths, a bicycle network having bike paths, bike lanes on road segments, and/or road segments appropriate for bicycle travel, a public transit network including, for example, railroads, public bus lines, tourist bus lines, metro railway lines (e.g., subways and elevated lines), light rail (e.g., trams, trolleys, or street cars), water taxi, and stations and/or stops for one or more of each, or combinations thereof. The region 100 may include other networks, features, and/or points as well. The road network 102, particularly one or more of the road segments 104 and/or the intersections 106, may, in other embodiments, vary from what is depicted in FIG. 1.

Figure 2:
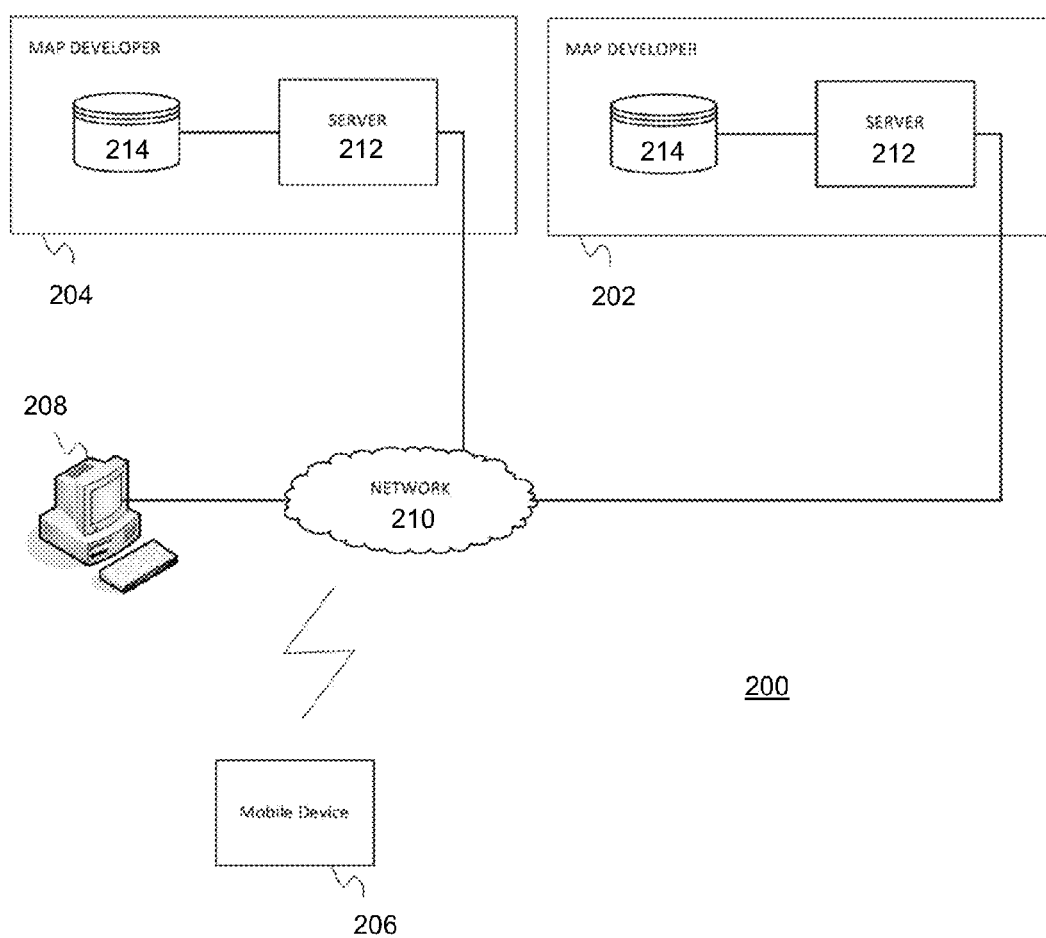
FIG. 2 shows an example system for determining data to display in response to a request for geographic data.

FIG. 2 shows an example system 200 for determining data to display in response to a request for geographic data. The system 200 includes a first map developer system 202, a second map developer system 204, a mobile device 206, a workstation 208, and a network 210. Additional, different, or fewer components may be provided. For example, many mobile devices 206 and/or workstations 208 connect with the network 210. As another example, no mobile devices 206 or no workstations 208 connect with the network 210. The first map developer system 202 and the second map developer system 204 each include a server 212 and a database 214. The first map developer system 202 may be maintained by a first entity (e.g., a first company), and the second map developer system 204 may be maintained by a second entity (e.g., a second company). Data stored in the database 214 of the first map developer system 202 may be generated by employees at the first company, one or more users at the mobile device 206 and/or the workstation 208, or other users, automatically generated by computing devices in communication with the first map developer system 202 via the network 210, or a combination thereof. Data stored in the database 214 of the second map developer system 204 may be generated by employees at the second company, one or more users at the mobile device 206 and/or the workstation 208, or other users, automatically generated by computing devices in communication with the second map developer system 204 via the network 210, or a combination thereof. The second company may be partnered with the first company or may be a competitor of the first company. The first map developer system 202 and the second map developer system 204 may each include more, fewer, or different components. The second map developer system 204 may include more, fewer, or different components than the first map developer system 202. As an example, the system 200 may include additional map developer systems in communication with the mobile device 206 and/or the workstation 208 via the network 210.

The database 214 of the first map developer system 202 and the database 214 of the second map developer system 204 may be geographical databases that include different geographical data. The geographical databases 214 may be NDS databases (e.g., created, compiled, or provided in accordance with the Navigation Database Standard) or other databases.

The databases 214 store or maintain geographic data such as, for example, road segment or link data records and node data records. The link data records are links or segments representing the roads, streets, or paths 104. The node data records are end points (e.g., intersections 106) corresponding to the respective links or segments of the road segment data records. The road link data records and the node data records may represent, for example, the road network 102 or other road networks used by vehicles, cars, and/or other entities. The road link data records may be associated with attributes of or about the roads 104 such as, for example, geographic coordinates, street names, address ranges, speed limits, turn restrictions at intersections, and/or other navigation related attributes (e.g., one or more of the road segments 104 is part of a highway or tollway, the location of stop signs and/or stoplights along the road segments 104), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections 106) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 214 may be maintained by one or more map developers (e.g., employees at the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel to travel by vehicle along roads throughout the geographic region to observe features and/or record information about the features. Also, remote sensing such as, for example, aerial or satellite photography may be used.

The databases 214 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The databases 214 may be master geographic databases, but in alternate embodiments, the databases 214 may represent compiled navigation databases that may be used in or with end user devices to provided navigation-related functions. For example, the databases 214 may be used with an end user device (e.g., the mobile device 206) to provide an end user with navigation features. In such a case, at least portions of the database 214 of the first map developer system 202 and/or the database 214 of the second map developer system 204 may be downloaded or stored on the mobile device 206, or the mobile device 206 may access the database(s) 214 through a wireless or wired connection (such as via one or more of the servers 212 and/or the network 210).

The computing resources necessary for determining geographic data to be displayed at a computing device and/or generating user requested maps may be divided between the server 212 of the first map developer system 202 and the mobile device 206 or the workstation 208. In one embodiment, the computing resources may be divided between the server 212 of the first map developer system 202, the server 212 of the second map developer system 204, and the mobile device 206 or the workstation 208. In some embodiments, the server 212 of the first map developer system 202 performs a majority of the processing ("server-based embodiments"). In other embodiments, the mobile device 206 or the workstation 208 performs a majority of the processing ("endpoint-based embodiments"). In additional embodiments, the processing is divided substantially evenly between the server 212 of the first map developer system 202 and the mobile device 206 or the workstation 208 ("hybrid embodiments"). Any combination of processing burden between the server 212 of the first map developer system 202 and the mobile device 206 or the workstation 208 may be used. As an example, the following initial discussion focuses on mobile device-based embodiments.

Figure 3:
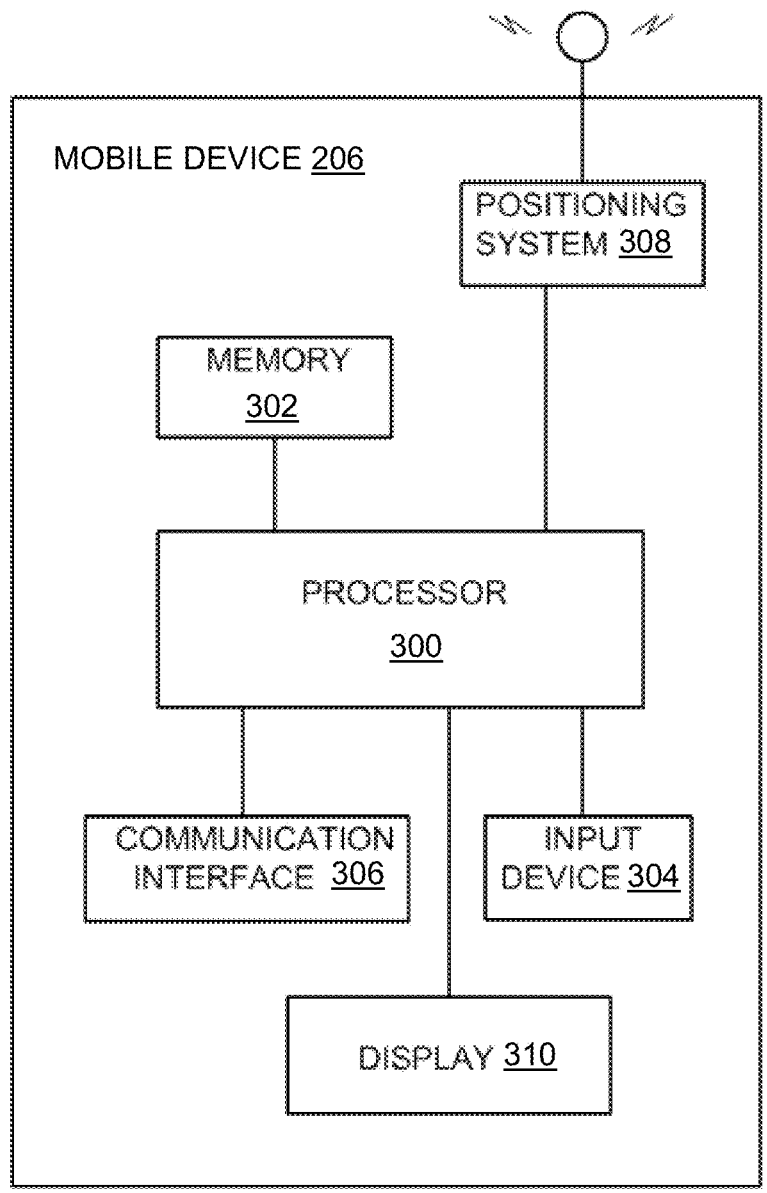
FIG. 3 shows one embodiment of a mobile device.

FIG. 3 illustrates a more detailed view of the mobile device 206. The mobile device 206 includes a processor 300, a memory 302, an input device 304, a communication interface 306, a positioning system 308, and a display 310. The processor 300 is a general processor, a central processing unit, a control processor, a graphics processor, a digital signal processor, an application-specific integrated circuit, a field-programmable gate array, a digital circuit, an analog circuit, combinations thereof, or any other type of processor suitable for mobile devices and/or computers.

The memory 302 may be a volatile memory or a non-volatile memory. The memory 302 may include one or more of a read only memory (ROM), random access memory (RAM), cache memory, a flash memory, an electronic erasable program read only memory (EEPROM), or other type of memory. The memory 302 may include an optical, magnetic (hard drive) or any other form of data storage device. The memory 302 may be removable from the mobile device 206, such as a secure digital (SD) memory card.

The input device 304 may be one or more buttons, keypad, keyboard, mouse, stylus pen, trackball, rocker switch, touch pad, voice recognition circuit, or other device or component for inputting data to the mobile device 206. The input device 304 and the display 310 may be combined as a touch screen, which may be capacitive, resistive, or acoustic (e.g., surface acoustic wave). The display 310 may be a liquid crystal display (LCD) panel, light emitting diode (LED) screen, thin film transistor screen, or another type of display.

The communication interface 306 may include any operable connection, such as a wireless transceiver. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities (e.g., the mobile device 206 and the first map developer system 202) may be operably connected to communicate signals to each other directly or through one or more intermediate entities (e.g., processor, operating system, logic, software). Logical and/or physical communication channels may be used to create an operable connection. For example, the communication interface 306 may include an output communication interface devoted to sending signals, data, packets, or datagrams and an input communication interface devoted to receiving signals, data, packets, or datagrams. The communication interface 306 provides for wireless and/or wired communications in any now known or later developed format.

The positioning system 308 includes a global positioning system (GPS), cellular, or other position sensor for providing location data. The positioning system 308 may utilize GPS-type technology, a dead reckoning-type system, or combinations of these or other systems. In one embodiment, the positioning system 308 may include an application specific integrated circuit, a field programmable gate array, or another processor for correlating GPS signals from multiple satellites and determining a global position. By determining a change in position from data provided by the positioning system 308, the speed, acceleration, distance or other movement characteristic may be calculated. The positioning system 308 may alternatively or additionally include suitable sensing devices that measure, for example, the traveling distance, the traveling speed, the traveling direction, or combinations thereof, of the mobile device 206. For example, an accelerator or gyroscope indicates changes in orientation or acceleration.

The mobile device 206 may include navigation-related and map-related application software program(s) that provide various navigation and map features and functions such as route calculation, route guidance, map display, positioning, local search, destination selection, and other functions. The navigation-related and map-related application software program(s) may be generated and maintained by the first company. A geographic database associated with the navigation-related and map-related application software program(s) may be located remotely from the mobile device 206 (e.g., the database 214 of the first map developer system 202). In one embodiment, the mobile device 206 may include the geographic database. In another embodiment, the navigation-related and map-related application software program(s) may be run remotely from the mobile device 206 or may rely on download to the mobile device 206.

The mobile device 206 may be a cellular telephone, a mobile phone, a smart phone, a personal digital assistant (PDA), a tablet computer, a laptop computer, a personal navigation device (PND), a portable navigation device, a navigation system built into a vehicle and/or any other mobile electronic devices.

The mobile device 206 is configured to receive data representing a request for geographic data. The geographic data may include data representing a POI, data representing a location, data representing a geographic area, data representing a route between a combination of POIs and/or locations, or a combination thereof. A user of the mobile device 206 may open the navigation-related and/or map-related application software program (e.g., the application software program) stored on the mobile device 206 using the input device 304. Alternatively, the application software program may be web based. Within the application software program, the user may enter, using the input device 304, the data representing the request for geographic data. The data representing the request may be, for example, textual data representing a location or a POI (e.g., a first location or POI), for which a map is to be displayed at the display 310 of the mobile device 206. The user may enter the textual data into a search box within a graphical user interface (GUI) of the application software program. For example, the user may enter "222 W Merchandise Mart Plaza, Chicago, Ill. 60654" into the search box within the GUI. The user may also enter textual data representing another location or POI (e.g., a second location or POI) if a route (e.g., between the first location or POI and the second location or POI) is to be calculated and displayed at the display 310 of the mobile device 206.

For example, the user may input the textual data representing the first location or POI and/or the textual data representing the second location or POI within the navigation-related and/or map-related application software program using a touchscreen of a smartphone 206. The processor 300 of the mobile device 206 may receive the data representing the first location or POI and/or the data representing the second location or POI from the input device 304. In other embodiments, the data representing the request for geographic data may be voice data received at the input device 304, input data from the input device 304 in combination with data from the positioning system 308, data from another computing device, or a combination thereof. For example, the user may use the input device 304 to identify, within the navigation-related and/or map-related application software program, that a map of a current location of the mobile device 206, as identified by the positioning system 308, is to be displayed at the display 310.

The mobile device 206 is configured to initiate a first search for the geographic data. The first search is of the database 214 of the first map developer system 202 (e.g., the first database). The first database 214 is associated with the navigation-related and/or map-related application software program stored on the mobile device 206. The processor 300 of the mobile device 206, for example, may initiate the first search when the user selects, using the input device 304, a button (e.g., a "search" button) within the GUI after the textual data, for example, is entered. Alternatively, the processor 300 may initiate the first search based on a voice command from the user received at the mobile device 206. Other inputs at the mobile device 206 may trigger the initiation of the first search for the geographic data.

Communication between the mobile device 206 and the first map developer system 202 via the network 210 may be established by the communication interface 306. The network 210 may utilize cellular technologies including 3G, 4G, or WiMAX. Alternatively or additionally, the network 210 may be any protocol that is used to couple two computing devices together. For example, the communication paths may utilize Ethernet, wireless, transmission control protocol (TCP), Internet protocol (IP), or multiprotocol label switching (MPLS) technologies. Combinations of networks such as communication from the mobile device 206 over a cellular network and a landline network connected with the first map developer system 202 may be provided. The phrases "in communication" and "couple" are defined to be a direct connection or an indirect connection through one or more intermediate components. Such intermediate components may include both hardware and software based components.

The processor 300 of the mobile device 206 may initiate the transfer of the textual data entered by the user, for example, from the mobile device 206 to the server 212 of the first map developer system 202 via the network 210 with instructions (e.g., generated by the processor 300) to search the first database 214. The server 212 of the first map developer system 202 searches the first database 214 based on, for example, the data representing the request for geographic data (e.g., the textual data entered by the user at the mobile device 206) received from the mobile device 206 and collects first data. The geographic data to be collected is based on the data representing the request (e.g., the textual data entered into the search box within the GUI). For example, if the user enters the location (e.g., 222 W Merchandise Mart Plaza, Chicago, Ill. 60654) into the search box within the GUI, the geographic data to be returned by the search may include data representing a geographic area around the location in addition to data representing the location. The size of the geographic area around the location may depend on parameters defined within the application software program. The parameters may include, for example, a changeable zoom factor for display of the map within the GUI and/or a changeable mode (e.g., map mode or directions/navigation mode) within the application software program. Other parameters may at least partially define the size of the geographic area around the location to be displayed. In one embodiment, as the zoom factor increases, the size of the geographic area around the location to be represented by the geographic data decreases. In another embodiment, the size of the geographic area around the location to be represented by the geographic data is larger for the map mode than for the directions mode.

The first data, which is collected by the server 212 of the first map developer system 202, may be more, less, all, or none of the geographic data depending on what data has been generated and stored at the first database 214. For example, the user may enter the location (e.g., 222 W Merchandise Mart Plaza, Chicago, Ill. 60654) into the search box. In the map mode, for example, the geographic data may include data representing the location entered into the search box within the GUI, a POI associated with the location (e.g., a restaurant), and data representing an area around the location based on the changeable zoom factor (e.g., a square mile centered around the location). As one example, the server 212 of the first map developer system 202 may collect the data representing the location and the data representing the area around the location. The first database 214 may not include the data representing the POI associated with the location. As another example, the first database 214 may not include any of the geographic data, and the server 212 of the first map developer system 202 may not collect any data. As a further example, the first database 214 may include all of the geographic data, and the server 212 of the first map developer system 202 may collect all of the geographic data.

The server 212 of the first map developer system 202 may transmit the first data collected from the first database 214 to the mobile device 206 via the network 210.

The mobile device 206 is configured to initiate a second search for the geographic data based on the initiated first search. The second search is of the database 214 of the second map developer system 202 (e.g., the second database). The second database 214 is created and maintained by the second company. The second database 214 may be associated with a navigation-related and/or map-related application software program created and maintained by the second company. The second company may be a competitor or a partner of the first company. The first company and the second company may have an agreement in place identifying circumstances when the application software program associated with the first company may search for and use data stored at the second database 214. For example, the agreement may allow the application software program associated with the first company to use data stored at the second database 214 when the first database 214 includes data the second database 214 does not include. The data stored at the second database 214 may be exchanged for the data the second database 214 does not include (e.g., an address of a restaurant in exchange for the name of the restaurant) via the network 210. Alternatively or additionally, the agreement may allow the application software program associated with the first company to use data stored at the second database 214 if the application software program accepts and displays advertising data from the second company. The agreement may take other forms.

In one embodiment, the processor 300 of the mobile device 206, for example, initiates the second search only when the first data transmitted to the mobile device 206 includes less than all of the geographic data (e.g., the second search is in series with the first search). For example, the first database 214 may not include data representing the location (e.g., the address) but may include the data representing the area around the location. The processor 300 of the mobile device 206 may determine a portion of the geographic data that the first data transmitted to the mobile device 206 does not include (e.g., the data representing the location). Alternatively, the server 212 of the first map developer system 202 may identify the portion of the geographic data and may generate a notification indicating such to be transmitted with the first data.

In one embodiment, when the processor 300 of the mobile device 206, for example, determines that the first data transmitted by the server 212 of the first map developer system 202 does not include the portion of the geographic data, the processor 300 may generate a message and display the message to the user of the mobile device 206 at the display. The message may state that the first database 214 does not include all of the geographic data and that the second database 214 or another database will be searched for the portion of the geographic data not included in the first database 214. The message may also request that the user input the portion of the geographic data not included in the first database 214 using the input device 304 of the mobile device 206 so that the portion of the geographic data may be added to the first database 214. Alternatively, the message may ask the user if she would like to be directed to the application software program associated with the second company or another company (e.g., another application software program). If the user responds in the affirmative using the input device 304, for example, and is directed to the other application software program by the processor 300 of the mobile device 206, the processor 300, using logic stored at the mobile device 206, for example, may redirect the user to the application software program associated with the first company when the user is finished using the other application software program (e.g., reopen the application software program associated with the first company). The processor 300 may reopen the application software program associated with the first company based on inputs received from the user at the input device 304 (e.g., an input from the touchscreen associated with closing the other application software program). In another embodiment, if there is an agreement between the first company and the second company to share data, the processor 300 automatically initiates the second search when the processor 300 determines that the first data transmitted by the server 212 of the first map developer system 202 does not include the portion of the geographic data. In such an embodiment, the user of the mobile device 206 may not be notified that the second database 214 is being searched.

Communication between the mobile device 206 and the second map developer system 204 via the network 210 may be established by the communication interface 306. The processor 300 of the mobile device 206 may generate and transmit a request for the portion of the geographic data to the server 212 of the second map developer system 204. In one embodiment, the processor 300 of the mobile device 206 may request more than the portion of the geographic data (e.g., all of the geographic data). The server 212 of the second map developer system 204 searches the second database 214 based on, for example, the request for the portion of the geographic data generated by and received from the processor 300 of the mobile device 206 and collects second data. If the second database 214 includes the portion of the geographic data, the server 212 of the second map developer system 204 may transmit the second data collected from the second database 214 to the mobile device 206 via the network 210. The system 200 of FIG. 2 illustrates two map developer systems 202, 204. In other embodiments, however, the mobile device 206 may search more than two map developer systems for the geographic data. For example, if the second database 214 includes less than all of the portion of the geographic data, the server 212 of the second map developer system 204 may transmit the data included in the second database 214, and the processor 300 of the mobile device 206 may initiate a third search. The third search may be of a third map developer system. The processor 300 of the mobile device 206 may search different map developer systems until the portion of the geographic data is found. For example, the processor 300 of the mobile device 206 may search four, five, or more map developer systems for the geographic data.

In one embodiment, the processor 300 of the mobile device 206, for example, automatically initiates the second search when the first search is initiated. The processor 300 may not wait for a reply from the server 212 of the first map developer system 202 to determine if the second search should be initiated or how much data should be searched for. In other words, the second search is initiated in parallel with the initiation of the first search. The processor 300 of the mobile device 206 may initiate the transfer of the textual data entered by the user, for example, from the mobile device 206 to the server 212 of the second map developer system 204 via the network 210 with instructions (e.g., generated by the processor 300) to search the second database 214. The server 212 of the second map developer system 202 searches the second database 214 based on, for example, the data representing the request for geographic data (e.g., the textual data entered by the user at the mobile device 206) received from the mobile device 206 and collects the second data. The geographic data to be collected is based on the data representing the request (e.g., the textual data entered into the search box within the GUI).

In one embodiment, the initiated second search causes the server 212 of the second map developer system 204 to search the second database 214 for and collect, if available at the second database 214, all of the geographic data. If the first database 214 and the second database 214 both include all of the geographic data that is the subject of the request received by the mobile device 206, the mobile device 206 may receive all of the geographic data from both the first database 214 and the second database 214.

In another embodiment, the initiated second search causes the server 212 of the second map developer system 204 to search the second database 214 for and collect less than all of the geographic data. In such a case, the mobile device 206 may receive duplicative data from the first database 214 and the second database 214, but the first data received from the first database 214 may represent a larger area around the location, for example, than the second data. The processor 300 of the mobile device 206 may apply logic and thresholds to determine how much data to search for and collect from the second database 214.

The logic and the thresholds may be predetermined and stored in the memory 302, for example. The logic and the thresholds may be different depending on the changeable mode within the application software program (e.g., map mode or directions mode). For example, the data to be searched for and collected from the second database 214 may represent a greater area (e.g., area around the location) when the application software program is in the map mode than when in the directions mode (e.g., area around the route). The logic and the thresholds may also depend on characteristics of the geographic area the geographic data represents. The characteristics may include, for example, the population of the city the geographic data at least partially represents, one or more POIs represented by the geographic data, a geographic area the geographic data represents, or any other characteristics. For example, if the geographic data represents a portion of a large city (e.g., Chicago), the data to be searched for and collected from the second database 214 may represent a smaller area than if the geographic data represents a portion of a smaller city (e.g., Gurnee). The first database 214 and/or the second database 214 may be more likely to include the geographic data when the geographic data represents the large city. Data representing populations of cities represented by the data stored at the first database 214 and the second database 214 may be stored at the first database 214, the second database 214, the mobile device 206, or a combination thereof. The data representing populations may be accessed by the mobile device 206, for example, when the amount of data to be searched for and collected from the second database 214 is determined by the processor 300. As another example, if a POI (e.g., restaurant) that is searched for is in close proximity (e.g., within 50 meters) to a large number of other POIs (e.g., twenty other restaurants in a food court), as represented by the geographic data, the data to be searched for and collected from the second database 214 may include data representing all of the other POIs. Other logic and thresholds may be applied.

In one embodiment, the first data and the second data received at the mobile device 206 from the first map developer system 202 and the second map developer system 204, respectively, are stored in cache memory 302, for example, at the mobile device 206. In another embodiment, the first data received at the mobile device 206 from the first map developer system 202 is stored in cache memory 302 at the mobile device 206, and the second data is stored in memory at the server 212 of the second map developer system 204. The processor 300 of the mobile device 206 may then retrieve the second data stored at the server 212 of the second map developer system 204 at a later time if necessary.

The mobile device 206 is configured to determine data to be displayed at the mobile device 206. The data to be displayed at the mobile device 206 includes the first data, the second data, other data received from other map developer systems, or a combination thereof.

For the embodiment where the initiation of the second search is in series with the initiation of the first search, when the first data received by the mobile device 206 includes all of the geographic data that is the subject of the request, the first data may be displayed at the mobile device 206, and the second database 214 is not searched. When the first database 214 does not include any of the geographic data (e.g., the mobile device 206 does not receive the first data), the second data received by the mobile device 206, other data received from another map developer system, or a combination thereof is displayed at the mobile device 206. In one embodiment, when the first data received by the mobile device 206 from the server 212 of the first map developer system 202 does not include the portion of the geographic data (e.g., the first database 214 does not include the portion of the geographic data), the processor 300 may supplement the first data with the second data (e.g., the portion of the geographic data not included in the first data) received by the mobile device 206.

In one embodiment, the processor 300 may compare the first data with the second data and determine data included in the second data but missing from the first data. The first data may be supplemented with the determined data and displayed at the mobile device 206. For example, the user may remain within the application software program stored on the mobile device 206 and associated with the first company to view the supplemented first data. For navigation (e.g., directions mode within the application software program), the determined data may be used within the routing logic within the application software program stored on the mobile device 206. In one embodiment, the processor 300 may apply a threshold (e.g., a portion of the geographic data such as one half) to determine when the second data is to be displayed entirely instead of any of the first data.

For the embodiment where the second search is initiated in parallel with the initiation of the first search, the first data and the second data may be received from the first map developer system 202 and the second map developer system 204, respectively, and stored in the cache memory 302 of the mobile device 206, for example. The processor 300 of the mobile device 206 may monitor inputs to the mobile device 206 to determine which data (e.g., the first data, the second data, or a combination thereof) to display at the mobile device 206 and/or to determine when to delete the second data from the cache memory 302 of the mobile device 206. The monitored inputs to the mobile device 206 may include, for example, a user input at the input device 304 (e.g., the touchscreen) indicating that the user is closing the display of data or is exiting the application software program, a GPS signal received at the positioning system 308 of the mobile device 206, or any other input to the mobile device 206.

The processor 300 may display the first data once the first data is received from the first map developer system 202. The processor 300 may switch to the display of the second data or delete the second data from the cache memory 302 based on one or more of the monitored inputs to the mobile device 206 or the lack thereof. For example, if the user attempts to exit the display of the first data within the application software program or attempts to exit the application software program with an input to the mobile device (e.g., touching the touch screen or pressing a button on the mobile device) within a predetermined amount of time (e.g., two seconds), the processor 300 may display the second data or display a message asking the user if she would like to view the second data. As another example, if the user keeps the application software program open at the mobile device 206 for a predetermined amount of time while in the map mode or if the processor 300 receives a GPS signal from the positioning system 308 indicating that the user is routing to the location or POI searched for, for example, the processor 300 may delete the second data stored in the cache memory 302. Alternatively, a message may be displayed to the user after the first data has been displayed. The message may ask the user of the mobile device 206 if she is satisfied with the first data. If a user input in response to the message indicates that the user is satisfied with the first data, the processor 300 may delete the second data stored in the cache memory 302. If the user input in response to the message indicates that the user is not satisfied with the first data, the processor 300 may display some or all of the second data and/or delete the first data stored in the cache memory 302.

In one embodiment, the processor 300 may compare the first data saved in the cache memory 302 to the second data saved in the cache memory 302, and a combination of the first data and the second data may be displayed at the mobile device 206. For example, the portion of the geographic data not included in the first data but included in the second data may supplement the first data, and the supplemented first data may be displayed at the mobile device 206. Other combinations of the first data and the second data may be provided. In one embodiment, the processor 300 may automatically delete some or all of the first data or the second data based on the comparison of the first data to the second data. For example, the processor 300 may compare the first data to the second data, determine that the second data is substantially similar to and/or represents the same geographic information as the first data, and delete the second data.

When the user indicates, with the input device 304, that she is not satisfied with the first data, and the processor 300 displays some or all of the second data, the processor 300 may generate a message informing the user what the second data is and asking the user if the second data is helpful. If the user indicates, with the input device 304, that the second data is helpful, the processor 300 may generate a message requesting the user submit a report about the correction provided by the second data. The report about the correction may be used to fill gaps or fix inaccuracies in data stored in the first database 214. If the user does not submit the report in response to the request for submission, the processor 300 may generate a message requesting the user submit a report that indicates all of the information represented by the first data was not correct, and the gap or inaccuracy in the first database 214 will be fixed. The processor 300 may generate other messages to display to the user at the mobile device 206.

The workstation 208 may include at least a memory and processor and may be substituted for the mobile device 206 in the endpoint-based embodiments discussed above. In the endpoint-based embodiments discussed above, the mobile device 206 or the workstation 208 performs a majority of the processing.

The more times a user has to exit the application software program to conduct a separate search for the geographic data due to inaccurate or missing data, the less likely it may be the user continues using the application software program associated with the first company. By supplementing the first data with the second data or automatically displaying the second data when the first database 214 does not include the geographic data being searched for, the user may be more likely to continue using the application software program associated with the first company and may be less likely to download an application software program associated with the second company.

Figure 4:
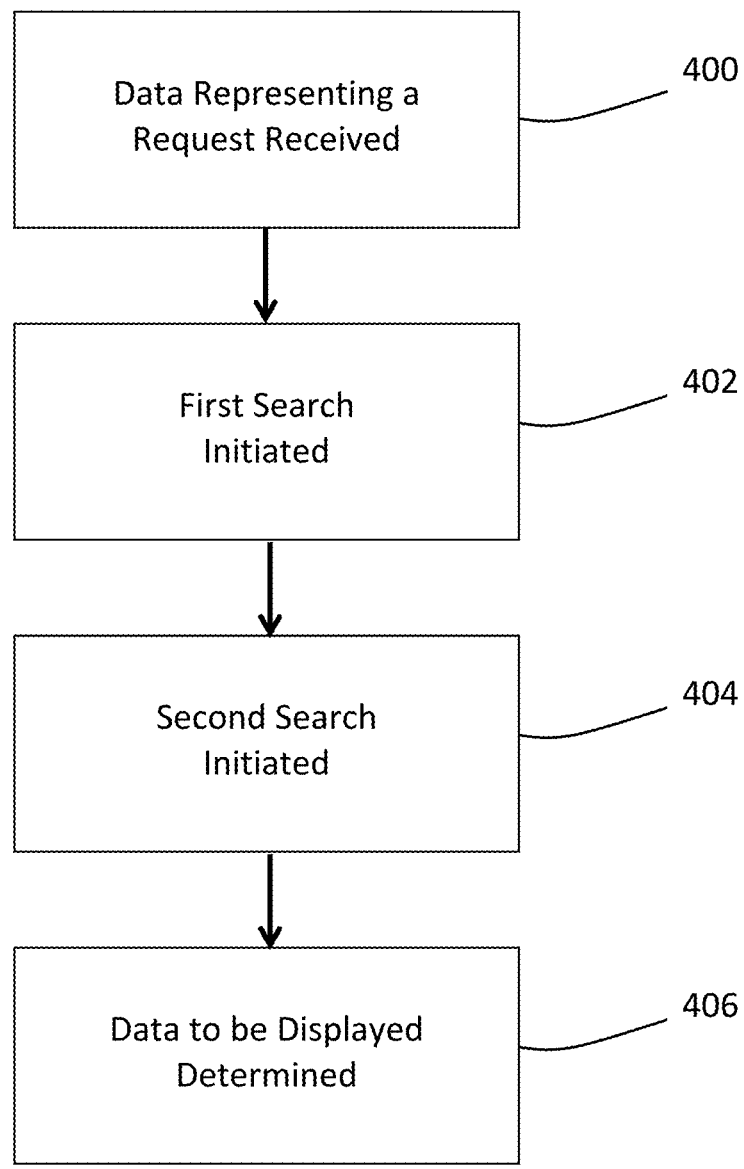
FIG. 4 shows a flow chart of one embodiment of a method for determining data to display in response to a user request for geographic data.

FIG. 4 shows a flowchart of one embodiment of a method for determining data to display in response to a request for geographic data. The method may be performed using the system 200 shown in FIG. 2 or another system. The method is implemented in the order shown, but other orders may be used. Additional, different, or fewer acts may be provided.

In act 400, data representing a request for geographic data is received. The geographic data may include data representing a point of interest (POI), a location, a geographic area, a route between the POI and another POI, the location and another location, or the POI and the location, or a combination thereof. The data representing the request may, for example, be textual data representing the location and/or the POI. The data representing the request may be received, for example, from an input device of a computing device. The input device may be, for example, a touchscreen of a smart phone, a keyboard, a mouse, or any number of other input devices.

In act 402, a first search for geographic data is initiated. The first search is of a first geographic database. In act 404, a second search for geographic data is initiated based on the initiated first search. The second search is of a second geographic database. The first geographic database and the second geographic database may be remote from each other. A first company may maintain and operate the first geographic database while a second company may maintain and operate the second geographic database. The first company and the second company may be, for example, competitors or partners. In one embodiment, the second search may be initiated when the first geographic database does not include at least a portion of the geographic data. In other words, the initiation of the second search may depend on or may be in series with the initiation of the first search. In another embodiment, the second search may be initiated when the first search is initiated. In other words, the second search may be initiated in parallel with the initiation of the first search.

In act 406, data to be displayed at a computing device is determined with a processor. The data to be displayed at the computing device includes first data, second data, or a combination thereof. The computing device may be, for example, a mobile device or a workstation. The first data may be receivable in response to the initiated first search, and the second data may be receivable in response to the initiated second search. The first data and the second data may be stored in a memory of, for example, the computing device.

In one embodiment, the geographic data represents a location and data representing a POI corresponding to the location. The first data received from the first database in response to the initiated first search includes one of the data representing the location and the data representing the POI corresponding to the location. The first geographic database does not include the other of the data representing the location and the data representing the POI corresponding to the location. The processor, for example, determines whether the second geographic database includes the other of the data representing the location and the data representing the POI corresponding to the location. The second data received from the second database in response to the initiated second search includes the other of the data representing the location and the data representing the POI corresponding to the location when the second geographic database includes the other of the data representing the location and the data representing the POI corresponding to the location. The processor or another processor initiates an exchange of the first data for the second data between the first geographic database and the second geographic database when the second geographic database includes the second data and does not include the first data.

In another embodiment, the geographic data includes data representing a geographic area including a POI, a location, or the POI and the location. The portion of the geographic data not included in the first geographic database includes data representing the POI, the location, or the POI and the location. The first data received from the first geographic database in response to the initiated first search includes data representing at least a portion of the geographic area. The first geographic database does not include data representing the POI, the location, or the POI and the location. The second data received from the second geographic database in response to the initiated second search includes the data representing the POI, the location, or the POI and the location. The determining of the data to be displayed at the computing device includes supplementing the received first data with the received second data.

Figure 5:
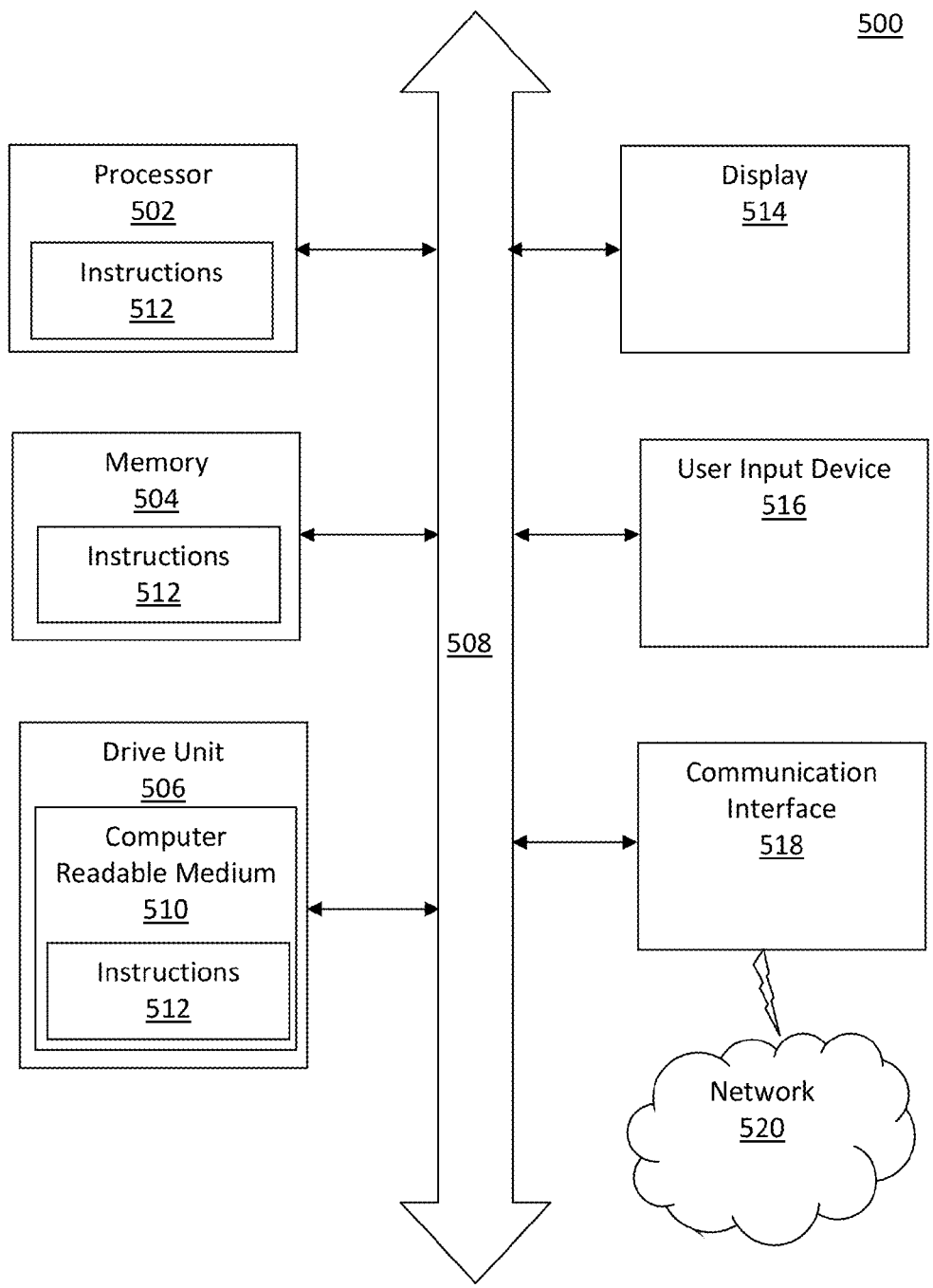
FIG. 5 shows one embodiment of a computer system for use with the system of FIG. 2.

FIG. 5 shows an illustrative embodiment of a general computer system 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. Any of the components discussed above may be a computer system 500 or a component in the computer system 500.

In a networked deployment, the computer system 500 may operate in the capacity of a server or as a client user computer in a client-server user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, the computer system 500 may include an input device 516 configured to allow a user to interact with any of the components of system 500. The input device 516 may be a number pad, a keyboard, or a cursor control device, such as a mouse, or a joystick, touch screen display, remote control or any other device operative to interact with the system 500.

In a particular embodiment, as depicted in FIG. 5, the computer system 500 may also include a disk or optical drive unit 506. The disk drive unit 506 may include a computer-readable medium 510 in which one or more sets of instructions 512, e.g. software, can be embedded. Further, the instructions 512 may embody one or more of the methods or logic as described herein. In a particular embodiment, the instructions 512 may reside completely, or at least partially, within the memory 504 and/or within the processor 502 during execution by the computer system 500. The memory 504 and the processor 502 also may include computer-readable media as discussed above.

The present disclosure contemplates a computer-readable medium that includes instructions 512 or receives and executes instructions 512 responsive to a propagated signal, so that a device connected to a network 520 can communicate voice, video, audio, images or any other data over the network 520. Further, the instructions 512 may be transmitted or received over the network 520 via a communication port 518. The communication port 518 may be a part of the processor 502 or may be a separate component. The communication port 518 may be created in software or may be a physical connection in hardware. The communication port 518 is configured to connect with a network 520, external media, the display 514, or any other components in system 500, or combinations thereof. The connection with the network 520 may be a physical connection, such as a wired Ethernet connection or may be established wirelessly as discussed below. Likewise, the additional connections with other components of the system 500 may be physical connections or may be established wirelessly.

The network 520 may include wired networks, wireless networks, or combinations thereof, and may be representative of the network 210. The wireless network may be a cellular telephone network, an 802.11, 802.16, 802.20, or WiMax network. Further, the network 520 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method comprising:
receiving data representing a request for geographic data;
initiating a first search for the geographic data, the first search being of a first geographic database associated with a first application;
determining that at least a portion of the requested geographic data is omitted from the first geographic database;
generating a first user message stating that the requested geographic data was not found in the first geographic database;
initiating a second search for the geographic data based on the initiated first search, the second search being of the second geographic database associated with a second application;
determining, with a processor, data to be displayed at a computing device, the data to be displayed at the computing device comprising a first data and a second data, the first data being receivable in response to the initiated first search, the second data being receivable in response to the initiated second search; and
generating a second user message stating that the second data from the second geographic database is included in response to the request for geographic data.

2. The method of claim 1, wherein the geographic data comprises data representing a point of interest (POI), a location, a geographic area, a route between the POI and another POI, the location and another location, or the POI and the location, or a combination thereof.

3. The method of claim 1, wherein initiating the second search for the geographic data based on the initiated first search comprises initiating the second search for the geographic data when the first geographic database does not include at least a portion of the geographic data.

4. The method of claim 3, wherein the geographic data comprises data representing a location and data representing a point of interest (POI) corresponding to the location, and wherein the method further comprises:
receiving the first data from the first geographic database, the first data including one of the data representing the location and the data representing the POI corresponding to the location, the first database not including the other of the data representing the location and the data representing the POI corresponding to the location;
determining when the second geographic database includes the other of the data representing the location and the data representing the POI corresponding to the location, the second data comprising the other of the data representing the location and the data representing the POI corresponding to the location when the second geographic database includes the other of the data representing the location and the data representing the POI corresponding to the location; and
initiating an exchange of the first data for the second data between the first geographic database and the second geographic database when the second geographic database includes the second data and does not include the first data.

5. The method of claim 3, wherein the geographic data comprises data representing a geographic area including a point of interest (POI), a location, or the POI and the location, the portion of the geographic data comprising data representing the POI, the location, or the POI and the location,
wherein the method further comprises:
receiving the first data from the first geographic database, the first data comprising data representing at least a portion of the geographic area, the first database not including data representing the POI, the location, or the POI and the location; and
receiving the second data from the second geographic database, the second data comprising the data representing the POI, the location, or the POI and the location, and wherein determining the data to be displayed at the computing device comprises supplementing the received first data with the received second data.

6. The method of claim 1, wherein initiating the second search for the geographic data based on the initiated first search comprises initiating the second search for the geographic data when the first search for the geographic data is initiated.

7. The method of claim 1, wherein the first geographic database is maintained by a first entity and the second geographic database is maintained by a second entity, wherein the first entity and the second entity are partner companies or competing companies.

8. The method of claim 1, further comprising:
generating a third user message requesting that the user provide the second data so that the second data may be added to the first geographic database.

9. The method of claim 1, further comprising:
updating first geographic database with the second data.

10. The method of claim 1, further comprising:
generating a third user message requesting the user submit a report regarding a correction to the first geographic database including the second data.

11. The method of claim 1, further comprising:
generating a third user message indicating to the user that the first geographic database will be updated with the geographic data omitted from the first geographic database.

12. An apparatus comprising:
a processor operable to identify data representing a request for geographic data; and
memory including computer program code, the memory and the computer program code configured to, with the processor, cause the apparatus at least to:
initiate a first search for the geographic data, the first search being of a first geographic database associated with a first map application;
determine that at least a portion of the geographic data is omitted from the first geographic database;
generate a message to a user indicating that at least the portion of the first geographic data is omitted from the geographic database;
initiate a second search for the geographic data based on the initiated first search, the second search being of a second geographic database associated with a second map application;

direct the user to the second map application in response to the request for the geographic data; and receive data from the second map application indicating that the geographic data was useful to the user and that the geographic data should be added to the first geographic database.

13. The apparatus of claim 12, wherein the apparatus is a mobile device, a personal computer, or a navigation device.

14. The apparatus of claim 12, wherein the apparatus is a server, the server comprising the first geographic database.

15. The apparatus of claim 12, wherein the processor is operatively connected to a computing device, the computing device comprising the second geographic database, and wherein the computing device is geographically remote from the apparatus.

16. The apparatus of claim 12, wherein the processor is operable to automatically initiate the second search for the geographic data when the first search for the geographic data is initiated, the second search being initiated in parallel with the first search.

17. The apparatus of claim 16, further comprising an input device and a communications interface operatively connected to the processor, wherein the processor is operable to receive the first data and the second data, and the memory is operable to store the received first data and the received second data, and wherein the processor is operable to:
identify a first input and a second input, the first input being at the input device, the second input being at the communications interface; and
delete the stored second data based on the first input, the second input, or a combination thereof.

18. The apparatus of claim 17, wherein the identified first input comprises a user input at the input device, and the identified second input comprises a global positioning system (GPS) signal received by the communications interface.

19. The apparatus of claim 17, wherein the processor is further operable to:
identify a display mode associated with the request;
determine additional geographic data based on the identified display mode, the initiated first search being for the geographic data and the additional geographic data, the initiated second search being for the geographic data and the additional geographic data;
receive the first data in response to the initiated first search;
receive the second data in response to the initiated second search;
compare the received first data to the received second data;
supplement the received first data with the received second data based on the comparison; and
display the supplemented first data.

20. In a non-transitory computer-readable storage medium configured to store instructions executable by one or more processors, the instructions configured to:
receive a request for geographic data from a user;
initiate a first search for the geographic data, the first search being of a first geographic database associated with a first map application;
generate a first message for the user stating that the requested geographic data was not found in the first geographic database and another database will be searched for the geographic data;
initiate a second search for the geographic data when the first search is initiated, the second search being of a second geographic database associated with a second map application;
receive and storing, with a memory, first data in response to the initiated first search;
receive and storing, with the memory, second data in response to the initiated second search;
determine data to be displayed at a computing device, the data to be displayed at the computing device comprising the stored first data, the stored second data, or a combination thereof, the data to be displayed at the computing device comprising at least a portion of the stored second data when the first geographic database includes less than all of the geographic data; and
generate a second message for the user stating that the portion of the second data from the second geographic database is included in response to the request for geographic data.

21. The non-transitory computer-readable storage medium of claim 20, wherein the instructions are further configured to determine a characteristic relating to the geographic data, and wherein the instructions are configured to initiate the second search such that a search for data representing a geographic area based on the determined characteristic relating to the geographic data is initiated, the data representing the geographic area comprising the geographic data.

22. The non-transitory computer-readable storage medium of claim 21, wherein the characteristic is a population of a city that the geographic data at least partially represents, one or more points of interest (POIs) represented by the geographic data or other data within the first geographic database or the geographic database, a geographic area the geographic data represents, or a combination thereof.

23. The non-transitory computer-readable storage medium of claim 20, wherein the instructions are further configured to:
determine, when the first database does not include at least a portion of the geographic data, when the stored second data includes the portion of the geographic data;
supplement the first data with a part of the stored second data representing the portion of the geographic data; and
display the supplemented first data at the computing device.

24. The non-transitory computer-readable storage medium of claim 23, wherein the instructions are further configured to:
identify an input at the computing device; and
initiate a display of data representing a request to a user of the computing device to input the portion of the geographic data based on the identified input at the computing device.

25. The non-transitory computer-readable storage medium of claim 20, wherein the instructions are further configured to:
identify an input at the computing device; and
delete the stored second data based on identified input at the computing device.

* * * * *